(No Model.)　　　　　　　　　　　　　　　　　　8 Sheets—Sheet 1.
J. T. LISTER.
APPARATUS FOR MAKING CARBONS.

No. 347,247.　　　　　　　　　　　Patented Aug. 10, 1886.

WITNESSES:　　　　　　　　　　　　　　　　INVENTOR
　　　　　　　　　　　　　　　　　　　　　　　　　John T. Lister
　　　　　　　　　　　　　　　　　　　　　　　By
　　　　　　　　　　　　　　　　　　　　　　　　H. T. Fisher
　　　　　　　　　　　　　　　　　　　　　　　　　ATTORNEY

(No Model.) 8 Sheets—Sheet 2.

J. T. LISTER.
APPARATUS FOR MAKING CARBONS.

No. 347,247. Patented Aug. 10, 1886.

WITNESSES:
E. A. Dick
N. L. Hodgkins

INVENTOR
John T. Lister
By H. T. Fisher
ATTORNEY.

(No Model.) 8 Sheets—Sheet 3.
J. T. LISTER.
APPARATUS FOR MAKING CARBONS.
No. 347,247. Patented Aug. 10, 1886.

WITNESSES:

INVENTOR
John T. Lister
BY H. T. Fisher
ATTORNEY

(No Model.) 8 Sheets—Sheet 4.

J. T. LISTER.
APPARATUS FOR MAKING CARBONS.

No. 347,247. Patented Aug. 10, 1886.

WITNESSES:

INVENTOR
John T. Lister
BY H. F. Fisher
ATTORNEY (No Model.) 8 Sheets—Sheet 5.
J. T. LISTER.
APPARATUS FOR MAKING CARBONS.

No. 347,247. Patented Aug. 10, 1886.

WITNESSES:
Wm. M. Monroe,
Chas. D. O'Connor

INVENTOR
John T. Lister
BY H. S. Fisher
ATTORNEY (No Model.)  8 Sheets—Sheet 7.

J. T. LISTER.
APPARATUS FOR MAKING CARBONS.

No. 347,247.  Patented Aug. 10, 1886.

WITNESSES
Wm M Moynel
Chas. D. O'Connor

INVENTOR
John T. Lister
by H. T. Fisher
ATTORNEY (No Model.) 8 Sheets—Sheet 8.

J. T. LISTER.
APPARATUS FOR MAKING CARBONS.

No. 347,247. Patented Aug. 10, 1886.

Witnesses.

Inventor
John T. Lister
H. T. Fisher
Attorney.

UNITED STATES PATENT OFFICE.

JOHN T. LISTER, OF CLEVELAND, OHIO.

APPARATUS FOR MAKING CARBONS.

SPECIFICATION forming part of Letters Patent No. 347,247, dated August 10, 1886.

Application filed April 1, 1886. Serial No. 197,410. (No model.)

*To all whom it may concern:*

Be it known that I, JOHN T. LISTER, a citizen of the United States, residing at Cleveland, in the county of Cuyahoga and State of Ohio, have invented certain new and useful Improvements in the Art of Manufacturing Carbons; and I do hereby declare that the following is a full, clear, and exact description of the invention, which will enable others skilled in the art to which it appertains to make and use the same.

My invention relates to improvements in the art of manufacturing carbons.

The ordinary process of making carbons is as follows: The composition being properly prepared by grinding and mixing the ingredients, the person known as the "molder" weighs it out on scales according to the size of the carbon to be produced. From the scales the material, or "dust," as it is usually termed, is poured into the mold, which, meantime, has been heated sufficiently in a furnace to melt the pitch contained in the dust and produce an agglutinated mass of proper consistency to be molded into the desired form and solidity. The mold is then placed in the hydraulic press and subjected to a pressure of from three to five hundred tons, after which it is removed from the press and the carbons taken from the mold and laid away to cool. The cooling required at this stage of the proceedings is such as will make the carbons firm enough to bear handling without sustaining injury. In the process of molding, a web unavoidably forms between the carbons of such weight and strength that all the carbons in that series or impression are held firmly together. Before anything further can be done it is necessary to break these webs and reduce the carbons to separate pieces. This is done by striking the webs, one after another, with a metal plate or knife. The division of the carbons being accomplished, the seams produced by the webs are removed and the carbons pointed, when they are ready for the furnace. By another process the points are formed in the molds.

It will be apparent from this brief statement of the method of making carbon points that it is exceedingly primitive and materially defective in several important particulars. In the first place the entire process, from the time the carbon-dust is placed in the scales till a marketable article is produced, except in the matter of pressing, is performed by manual labor. No successful attempt, as far as I am aware, has heretofore been made to introduce mechanical appliances to take the place of human hands in any of the steps above enumerated, with the trifling exceptions herein acknowledged. Now, when it is remembered that carbon-manufacture is carried on on a large scale, and involves the employing of hundreds of men in a single factory, the expensiveness of the present system will be appreciated; but the old process is objectionable apart from the matter of cost.

First. It is impossible to distribute the material equally to all parts of the mold by pouring it directly from the scales, as is the common practice, for the reason that the material becomes more or less packed in the center, where it is emptied, while it is light at the sides and ends, to which it is afterward spread, thus producing carbons of unequal density in themselves and of unequal weight compared with each other.

Secondly. The removal of the carbons from the mold while warm is objectionable, because the work can scarcely be done without inflicting more or less injury. The practice is to lift the carbons bodily up at one end and while in that position to introduce a thin metal plate, on which they are removed to the cooling-table, where the sheets or forms are placed one upon the other; but being warm, and hence soft and flexible, they are exceedingly liable to become bent, and therefore damaged, if not rendered worthless, by this change. Indeed, one of the principal objects in placing one layer of carbons upon another after removing them from the mold is to take out the crooks and bends produced by handling at this time; but this method of straightening is only partially successful, and the result is, that many carbons are thus irreparably injured.

Thirdly. The web being broken by striking it with a metal plate, as above indicated, leaves a ragged edge or seam, which has to be removed by handling each carbon separately and scraping the seam or grinding it down by means of an emery-wheel—a process that at best is very slow, and results in frequent breaking of carbons. This process is varied by forcing the carbon through an annular steel cutter; but the cutter does not wholly remove the seams, while it also breaks a number of points.

Fourthly. The method of pointing carbons by grinding on an emery-wheel is slow and tedious, requiring much care to get the point exactly in the center. The exception to this method is to form the point on the carbon in the mold.

Altogether, the loss of carbons by bending, breaking, and other fatal injuries amounts, in the best-regulated establishments, to fully twenty-five per cent. of the whole number originally placed in the molds, with a corresponding incidental loss of time and labor expended in their manufacture.

By my process these several objections are almost wholly, if not entirely, obviated, and new steps are introduced and mechanism employed whereby the manufacture of carbons is greatly simplified, cheapened, and improved.

Primarily, the invention consists in improvements in the process of making carbons, and, secondarily, in substituting machinery for hand-work in carrying the process into effect.

The improvements in the process consist, first, in the heating of the carbon-dust by placing it in the molds while they are cold and heating the molds and dust together; second, in the uniform distribution of the carbon-dust in the molds, so that carbons of equal density throughout their length, and of equal weight compared with each other, may be produced; third, in cutting the web close to the side of the carbon, thus avoiding a seam or rib, and leaving the carbon smooth and round; fourth, in pointing the carbons while warm by turning them between suitably-formed surfaces; fifth, in keeping the carbons in rotary motion over a smooth surface, and, if necessary, subjecting them to a cold blast while in this movement, to secure rapid and uniform cooling after the steps in their manufacture have been completed.

The improvement in the mechanism by which the process is carried out consists in the construction and combination of parts hereinafter fully described, and particularly pointed out in the claims.

In the drawings, Fig. 8 is a sectional view of the ratchet on line 4 4, Fig. 5. Fig. 14ᵃ is a detail of the sliding cut-offs.

Figure 11:
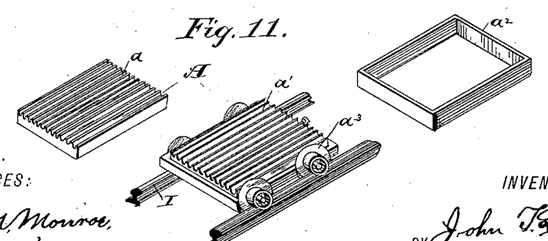
Fig. 11 shows a carbon-mold mounted on wheels, with the cover and inclosing-frame detached.

A, Fig. 11, represents the mold, consisting of upper and lower sections, $a\ a'$, and rectangular inclosing-frame $a^2$, of the usual form, and supported on flanged wheels $a^3$.

Figures 2, 15, 16:
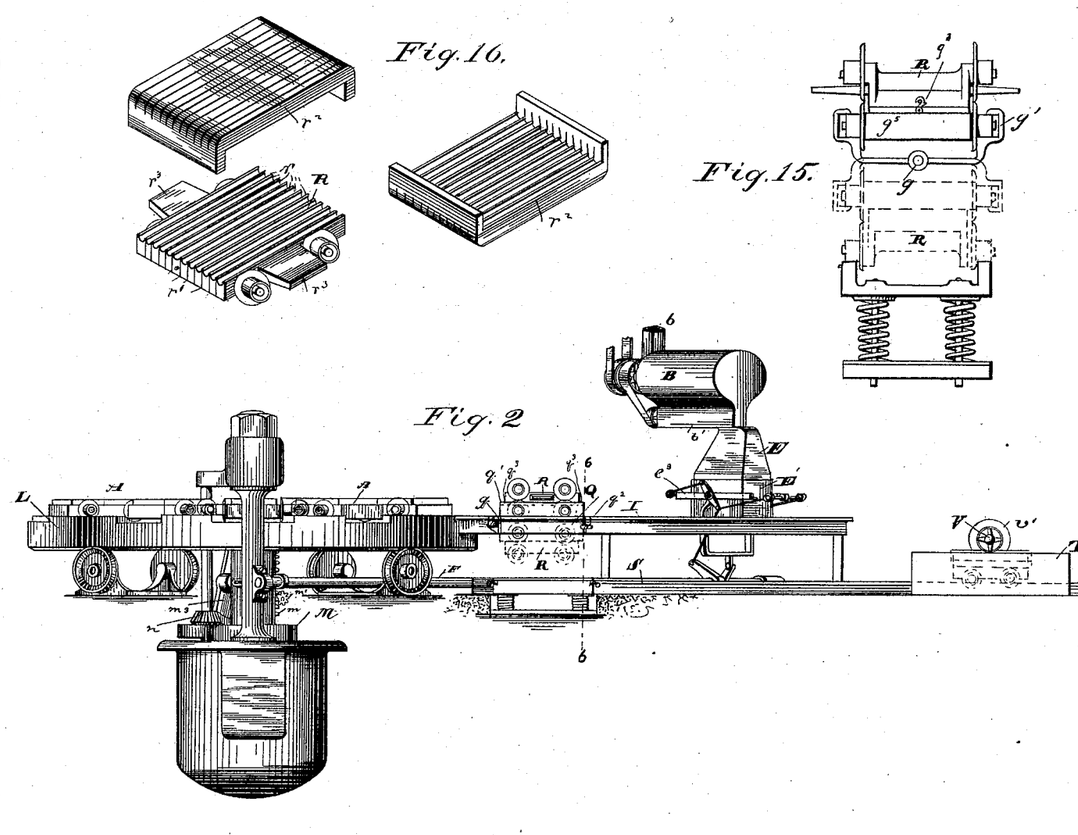
Fig. 2 is a side elevation of the same.
Fig. 15 is an end view of the reversing-car and mold in transferring position, taken on line 6 6, Fig. 2.
Fig. 16 is an isometric view of a transferring-car and its slotted cover detached.
Figures 4, 5, 6, 7:
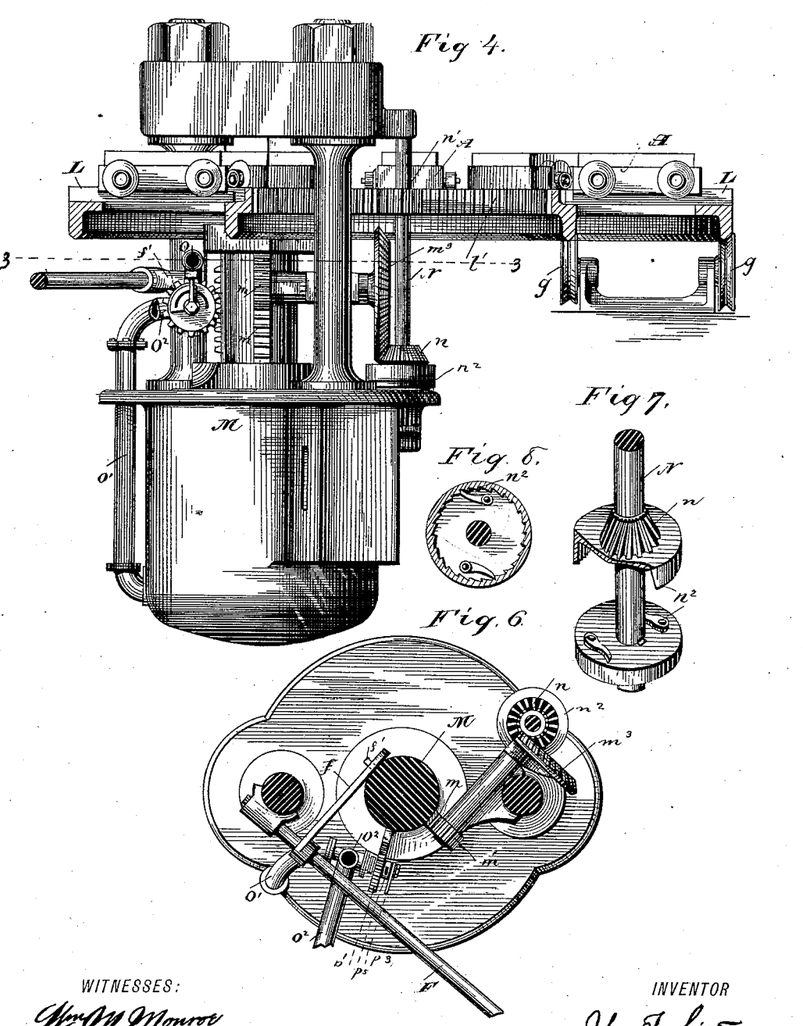
Fig. 4 is an elevation in section on line 1 1, Fig. 3, showing the hydraulic press or ram and its connecting mechanism from the interior of the table.
Fig. 5 is an elevation in section on line 2 2 of Fig. 3, showing the ram in position to operate on one of the molds.
Fig. 6 is a horizontal section on line 3 3, Fig. 4.
Fig. 7 is an isometric view of gear and ratchet for revolving the table carrying the molds.
Figure 5:
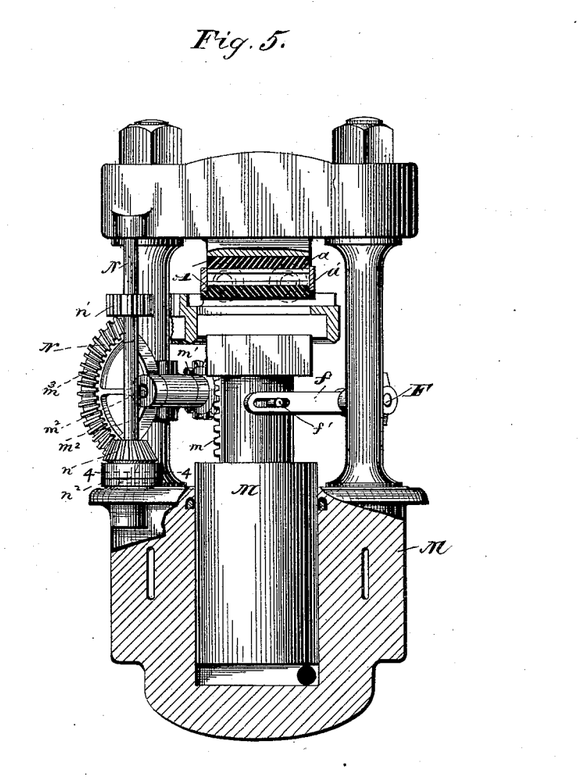
Figures 12, 14, 14A:
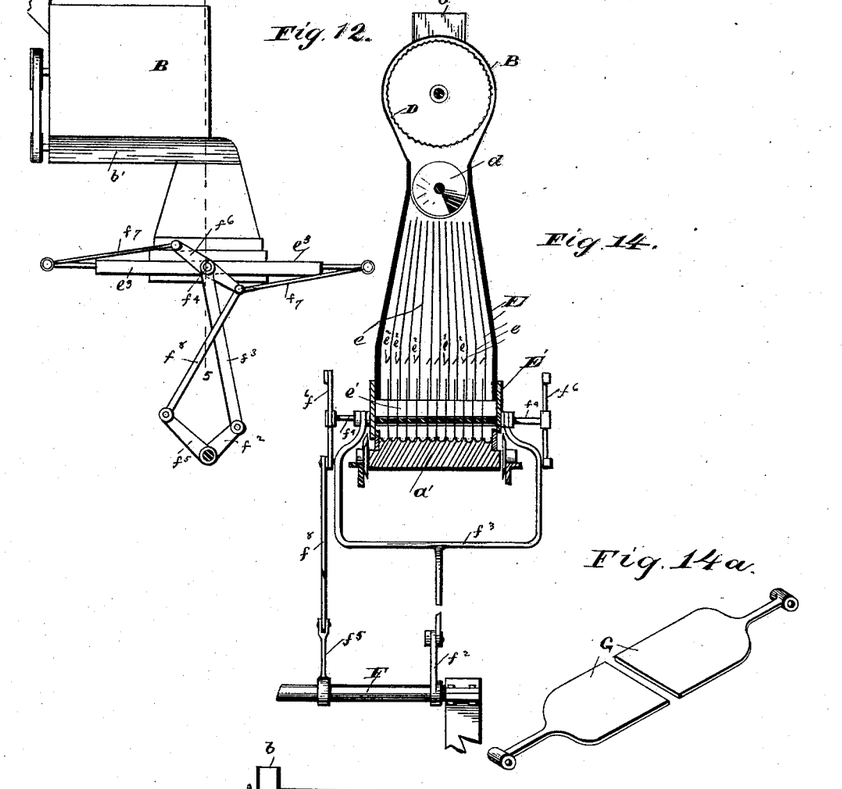
Fig. 12 is a side view of my automatic dust-feeding device.
Fig. 14 is an enlarged transverse vertical section thereof on line 5 5, Fig. 12.
Figure 13:
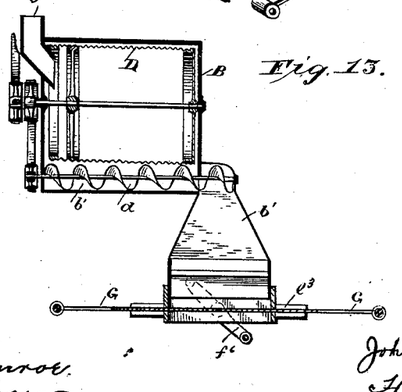
Fig. 13 is a vertical longitudinal section of the same.
Figure 17:
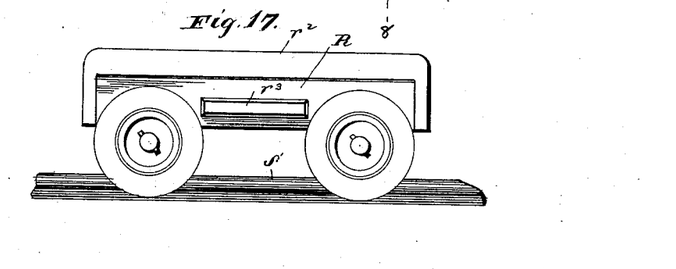
Fig. 17 is a side elevation of the same with the cover on the car.
Figure 18:
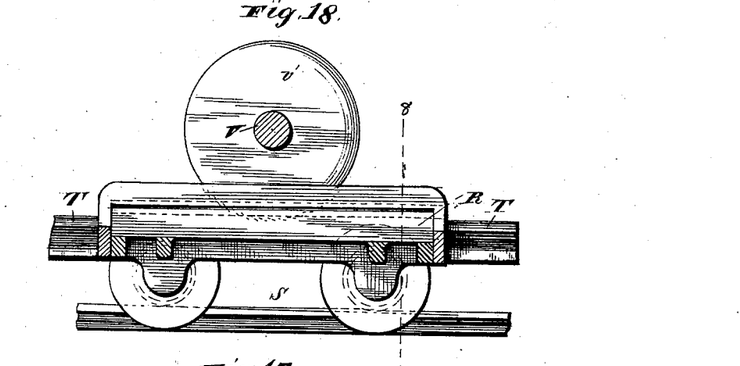
Fig. 18 is a longitudinal section on line 7 7, Fig. 19.

B, Fig. 12, is a cylindrical receptacle for the carbon-dust when suitably prepared to enter the mold, and has at its end a feed-spout, $b$. Within the receptacle B is a revolving screen, D, Fig. 14, which practically fills the interior of the receptacle, and is open at one end to allow the feed-spout to extend therein and deliver the dust toward the center of the screen. The screen is driven by power taken from any available source, a pulley on its shaft being provided for that purpose, and is designed to sift the dust into the conveying-trough $b'$ below. This trough is occupied by a conveyer or worm, $d$, run by a pulley and belt from the screen-shaft. The screen and conveyer not only perform the functions here assigned to them, but serve to thoroughly mix the carbon material, if this has not been well done before. Perfect mixing of the dust and the pitch is highly essential to good work, and cannot be accomplished without much painstaking labor. Any defects in this particular will therefore be remedied by the screen and conveyer. From the conveyer the material drops into the delivery-spout E, Fig. 14, which has partitions $e$, corresponding to the carbon-grooves in the mold A, and are designed to distribute exact and equal quantities of the material uniformly to each separate subdivision of the mold. Over the lower end of the delivery-spout is arranged a sleeve, E', adapted to slide up and down on the spout, and having partitions $e'$, corresponding to the partitions $e$, and serving to direct the material to its proper place in the mold. The movements of sleeve E' are automatic, and may be traced as follows: A shaft, F, supported in suitable bearings, is connected with the hydraulic ram by a rigid arm, $f$, Figs. 2 and 6, having a slot in its end, and working over a pin, $f'$, on the ram. On the opposite end of the shaft is another rigid arm, $f^2$, pivotally connected with a yoke, $f^3$, the arms of which are attached to trunnions $f^4$ on the sides of sleeve E'. Transversely through the lower part of the sleeve E', and within its end walls, is formed an opening, which corresponds to and is continued in the grooves in the guides $e^3$, formed on the sleeve E'. In these guides and opening I place slides or cut-offs G, one of which enters from each end or side of the sleeve, and has its bearing in the guide and opening. The shaft F has a third rigid arm, $f^5$, Fig. 12, and on one of the trunnions $f^4$ is mounted a centrally-pivoted lever, $f$. A link or rod, $f^8$, connects arm $f^5$ with one arm of the pivoted lever, and links $f^7$ connect said lever with the ends $g$ of the slides G. With the mechanism thus completed, the operation of this part of the machine is as follows: Let us suppose the slides G to be withdrawn and the sleeve down around the box of the mold. The mold having stopped beneath the delivery-spout just long enough to be filled—and this time is graduated to correspond exactly with the movements of the turn-table and the molds that have gone before, as will be seen farther on—the shaft F operates at the same time in the downward movement of the ram to close the slides in against each other, so as to cut off the feed, and to raise the sleeve to permit the mold or car to pass from beneath. Then at the proper time another car is placed in position. The reverse movement of the shaft, caused by the upward movement of the ram, opens the slides till they have cleared the interior of the sleeve and lowers the sleeve about the mold, when the operation of filling is repeated. This action is alternated while the machine is in operation, one mold being filled while another is being pressed, and so on indefinitely. To prevent the escape of dust between the partitions $e$ $e'$, where they overlap, deflectors $e^2$ are placed in the upper partitions. It should have been mentioned that by the method of feeding and distributing to the mold here adopted, and with the device for cutting off the supply, exactly an equal quantity of material is fed to each mold, and no system of weighing or measuring other than is thus provided is required.

Figure 1:
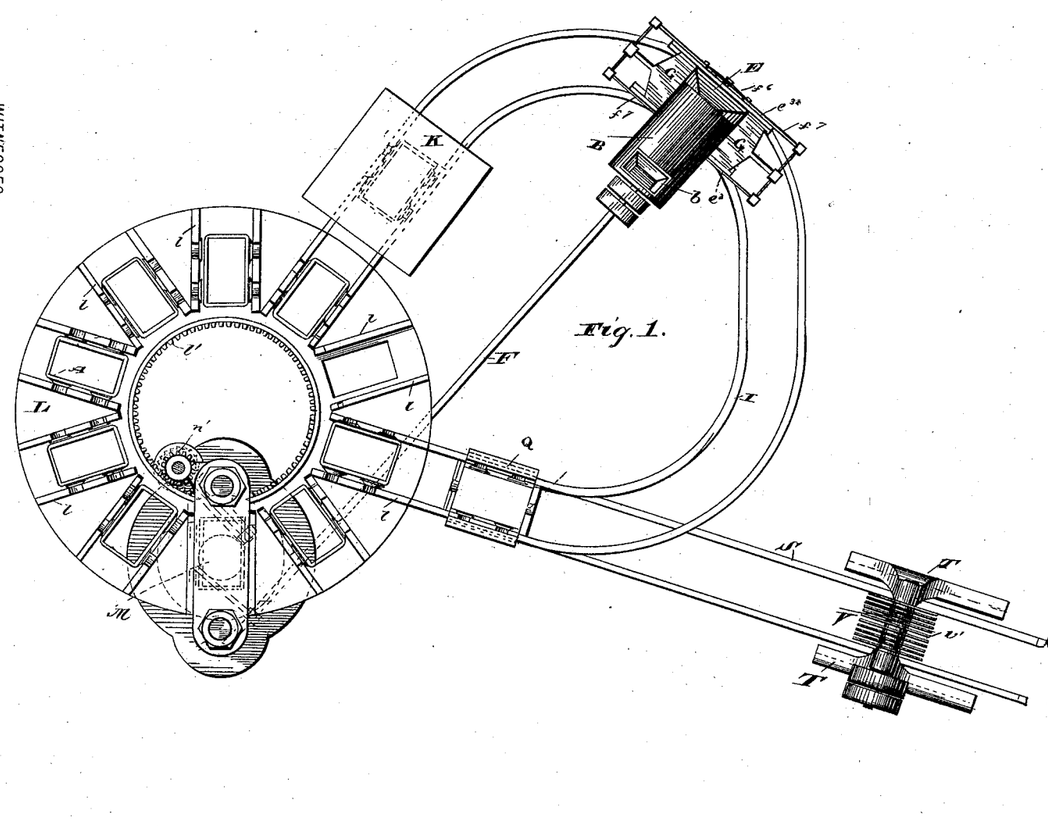
Figure 1 is a plan view of the carbon apparatus in its entirety, except the pointing mechanism.
Figures 3, 9, 10:
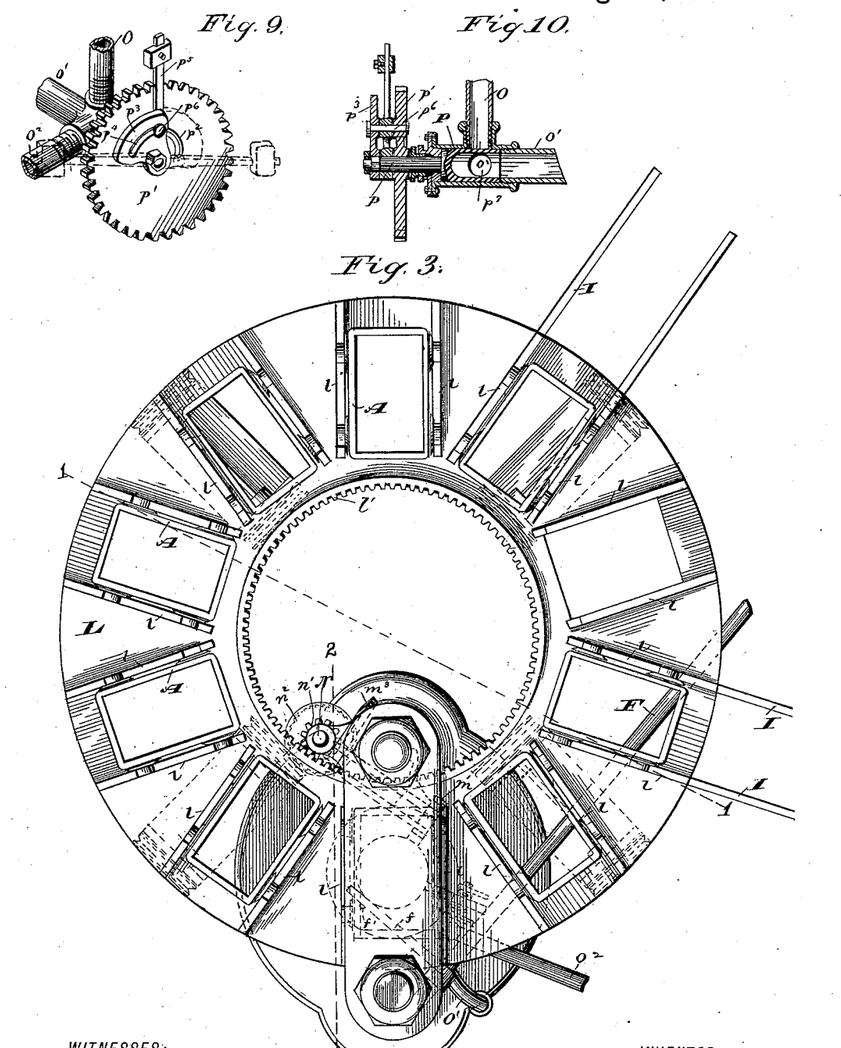
Fig. 3 is an enlarged plan view of the revolving table, showing the molds in position on its surface and the hydraulic press beneath.
Fig. 9 is a perspective view of the valve mechanism for controlling the movements of the ram through a rack on its side.
Fig. 10 is a vertical section of the same.

I, Fig. 3, represents a track on which the cars travel in a circuit to and from the place of filling. After being filled and covered the cars or molds are directed to the furnace K, Fig. 1. Here they remain a sufficient length of time to be so heated as to give the proper consistency to the carbon material preparatory to pressing. Thence they are passed onto the turn-table L, which is provided with a series of short tracks, $l$ $l$, arranged to register with the respective ends of the track I. Suitable stops are formed in the inner ends of the tracks $l$, so as to place each car in the proper position to pass into the press.

M represents the hydraulic press or ram, which may be of any well-known pattern, the press in itself forming no part of my invention. On a side of the piston I secure a rack, $m$, Figs. 4 and 5, which gears with a pinion, $m'$, on a shaft, $m^2$. The shaft $m^2$ has a segmental gear, $m^3$, which meshes with a bevel-wheel, $n$, on a vertical shaft, N. On the upper end of this shaft is a pinion, $n'$, which engages with a gear, $l'$, on the interior of the turn-table L, and on its lower end, beneath the bevel-wheel, is a pawl-and-ratchet device, $n^2$. (Shown clearly in Figs. 7 and 8.) The design of this mechanism is to revolve the turn-table L, and its operation is as follows: Supposing a mold to have been carried in position for pressing, the ram moves up and performs its work, but without turning the shaft N, for the reason that the ratchet device keeps the bevel-wheel $n$ out of engagement with said shaft; but the ram or press having reached the limit of its upward movement, the induction valve is reversed and the ram descends, which instantly starts the gearing in the opposite direction, throws the ratchets into engagement, and turns the shaft N and the turn-table till the segmental gear $m^3$ is exhausted, when the turn-table stops. The segmental gear is intended to be of such range as is required to move up another car or mold to replace the one that has been pressed, and to leave it exactly in its proper position for pressing. This of course occurs while the ram is descending, and there is no movement of the table when it ascends and presses the next succeeding mold. In carrying out these operations it is desirable to have the hydraulic press automatic in its movements, so that the action will be regular and uniform and the presence of an attendant at the valves may be dispensed with. This I accomplish in the manner following:

Referring to Figs. 9 and 10, Sheet 3, O represents the induction-pipe, O' the pipe leading to the hydraulic cylinder, and $O^2$ the eduction or discharge pipe. Extending into the pipe O' is a cylindrical valve, P, closely fitting said pipe, and having a closed outer end and an open inner end, and an annular opening at its side, which registers with both the induction and the eduction pipes O $O^2$ alternately. The valve P, Fig. 10, has a stem, $p$, projecting outward through packing in the head of pipe O', on which a gear-wheel, $p'$, is loosely mounted and adapted to turn independently of the said stem and valve. This wheel is provided with a curved slot, $p^2$, about midway between its axis and periphery. On the end of stem $p$ is rigidly secured a segmental plate, $p^3$, having a curved slot, $p^4$, corresponding to slot $p^2$ in the gear-wheel $p'$. Between the segmental plate and the gear-wheel is a weighted lever, $p^5$, pivoted loosely on valve-stem $p$, and provided near its center with a pin, $p^6$, which projects laterally on both sides of the lever into the slots $p^2$ and $p^4$ of the segment and gear-wheel, respectively. The gear-wheel meshes with a short rack on the hydraulic piston, by which it is operated. It will be seen that the pipes O O² are set at right angles to each other in the pipe O', so that they are but a quarter-turn apart. The valve P is therefore provided with an opening, $p^1$, in its side, which, when given a quarter-turn in either direction, will register with the induction and the eduction pipes alternately. I have therefore arranged my valve mechanism in such manner that the valve will be automatically thrown from one position to the other, according as the hydraulic piston is at the upper or the lower end of its stroke. This is accomplished by the weighted lever $p^5$ dropping right or left from a vertical position by its own gravity within the limits of the slot $p^2$ in the gear-wheel. Thus, for example, suppose the lever to have been raised from the left to a perpendicular position, as shown in Fig. 9. The instant it passes a perpendicular line it will fall to the right and carry the segmental plate $p^3$, which is rigid on the stem of valve P, with it, reversing the valve from communication with the eduction-pipe, as shown in Fig. 10, to the induction-pipe O. The instant this occurs the parts will be in the position shown in dotted lines on the right in Fig. 9, the slot in wheel $p'$ being behind the segmental plate and exactly opposite the slot in said plate. Then the hydraulic piston, being at the bottom of its movement, at once begins to ascend, and in doing so carries the gear-wheel up on the right. This movement goes on till the lever lifted by said wheel is again brought to a perpendicular position, when it drops to the left and reverses the valve to the eduction-pipe. In this action one end of the pin $p^6$ of the lever is caught in the slot $p^2$, while the other moves freely in slot $p^4$ till it reaches the upper end thereof. Meantime the segmental plate and valve remain unmoved, and the flow of fluid into the hydraulic cylinder goes on; but the instant the weighted lever passes the perpendicular position it falls to the left, one of its arms passing down in slot $p^2$, while the other carries the segmental plate with the valve P a quarter-turn to the left, when the change is completed. After a mold has passed through the press it is carried around on the turn-table till it reaches the discharge end of the track I, where it is switched off and run down to the reversing-table Q, Fig. 2. This table practically forms a part of the track I, but involves a separate construction. As here shown, the table is provided with trunnions $q$ centrally at each end, which rest in bearings on cross-bars between the rails, and flanged guideways $q'$ along its track, which serve to engage the hubs on the wheels of the mold while the table, with the mold therein, is being reversed. A suitable spring-latch, $q^2$, at the side of the table holds it steady when a mold is being taken on or discharged. A mold being run in upon the table, the cover and rectangular inclosing-box are removed and the car R (shown in Fig. 16) placed thereon in reverse position. The two cars are then locked together by latches $q^3$ at the end, Fig. 15, when they are in readiness to be bodily inverted and lowered to track S. This track has a table corresponding in position to the table Q, and is immediately beneath it. It is supported on strong springs at its corners, which, when permitted to exert their force, carry the section or table up in contact with the inverted car R, which by the change is now on the under side. The latches $q^3$ are then released, and the car R is lowered to the end of the track S and switched off. The other car is restored to the track I and started around to be refilled with carbon-dust and passes through the process hereinbefore described.

Figure 19:
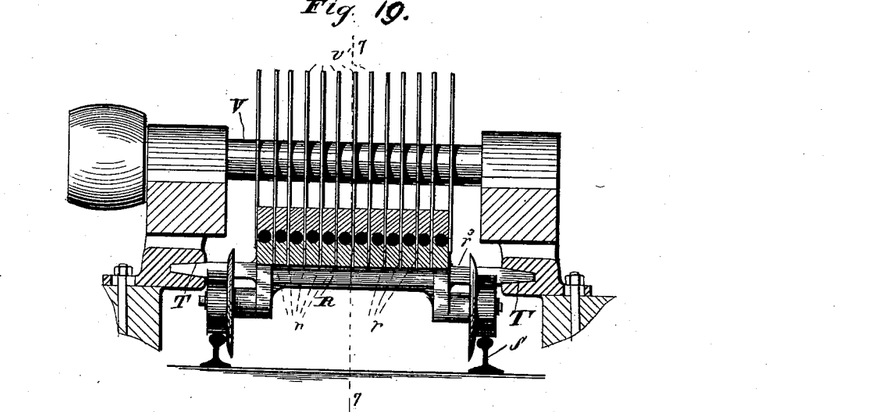
Fig. 19 is a transverse section on line 8 8, Fig. 18, showing the cutters in position to sever the webs between the sections.
Figure 20:
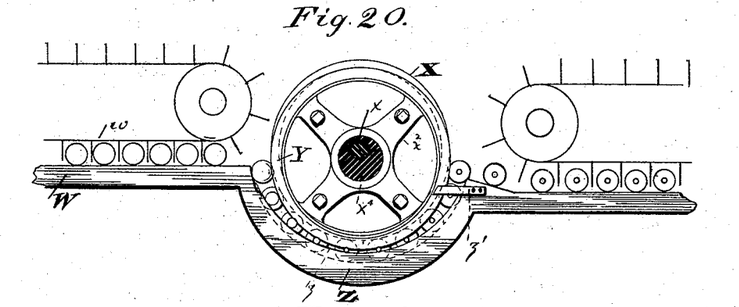
Fig. 20 is an end elevation of the carbon-pointing mechanism.
Figure 21:
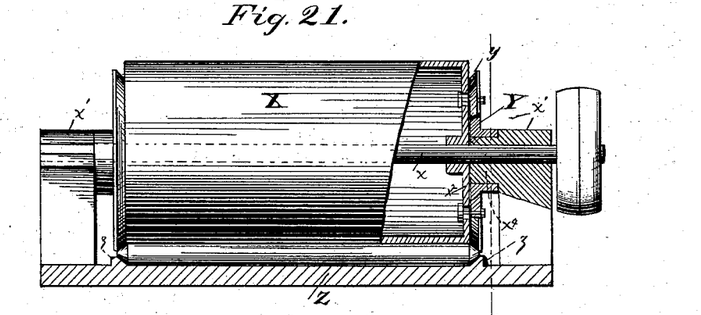
Fig. 21 is a side elevation thereof, partly in section.
Figures 22, 23:
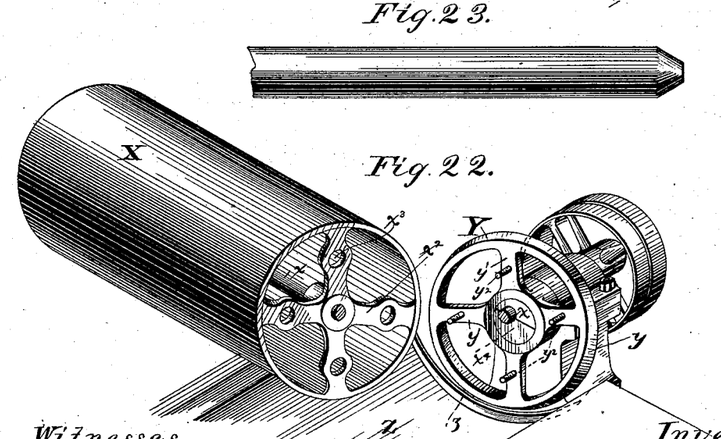
Fig. 22 shows the matching faces of the cylinder and pointing-wheel, the shaft being broken and the wheels turned at right angles to the cylinder.
Fig. 23 is a section of a carbon drawn to scale, and showing the exact size of point required.

It will be observed that the car R has a platform provided with grooves $r$, corresponding exactly to those in the mold in size and number. In the change from the upper to the lower track the carbons are transferred to this car. Up to this time all the carbons remain in the sheet of form in which they were pressed and are connected by webs. It is necessary now before proceeding further with the manufacture to divest the carbons of the webs and so dress them that no seams or ribs will be left along the side where the webs were connected. To accomplish this object, I form slots $r'$ between the grooves $r$ in the car R, which extend through the platform, and corresponding slots or cuts are made in the cover $r^2$ of the car. (Shown in Figs. 16 and 19.) This car is further provided with projections $r^3$ at its sides, which are adapted to enter guides T, placed at the side of the track, as shown in Fig. 19. Immediately above the center of the guides T is arranged a shaft, V, carrying a series of disks or cutters, $v$, designed to enter the slots in the car R and sever the carbon-webs. This shaft is driven by power taken from any available source, and the disks are preferably made with square edges and of such thickness that they will cut the web close to the carbon, thus leaving the carbon perfectly round after the web is removed. The operation of this part of the machine is as follows: The car R, being loaded with carbons and provided with its slotted cover, is driven along the track through the guides T and beneath the disks $v$, which are revolving at a high speed. The guides serve to accurately center each car as it comes along and bring the slots in perfect alignment with the disks, and the car being driven with sufficient impetus to clear the guides and the cutters, the severing of the webs is the work of but an instant. It is of course understood that as yet the carbons are warm and the material easily worked. The carbons are now in readiness to be pointed. From the car R they are delivered on a table, W, Fig. 20, above which is arranged an endless apron, $w$, having fingers for carrying the carbons forward in straight lines, so as to be uniformly and properly fed to the pointing mechanism. This mechanism consists of a plain revolving cylinder, X, hung suitably upon a shaft, $x$, in bearings $x'$, and having arms $x^2$ flush with its ends, which arms are provided with openings $x^3$. The shaft and cylinder are rigidly connected and turned by pulley and belt. At the ends of the cylinder are wheels Y, having inwardly-beveled edges $y$ and arms $y'$, provided with perforations for the passage of bolts $y^2$, by which they are secured to the arms of the cylinder. The bearings $x'$ have short annular projections $x^4$, arranged eccentrically to the axis of the shaft $x$, as shown in Fig. 21, and the wheels Y are provided with hubs adapted to revolve on these projections. Inasmuch as the cylinder and wheels are designed to revolve together, and are arranged on axes having different centers, it follows that there must be a movement between them equal to this difference, and this I have provided for in the enlarged openings $x^3$, in which the connecting-bolts are free to play. When united, the matching surfaces of the cylinder and wheels fit snugly upon each other at all points, and the bolts are screwed up to keep them in this relation, so that in operation they will act as if they were formed in a single piece. The cylinder and end wheels thus united and mounted revolve together over the concave bed Z, formed throughout with a surface corresponding exactly to the convexity of the cylinder, and firmly supported beneath, so that there will be no variance in the space between the parts. This space is designed to be adjusted exactly to the thickness of the carbons, so that as the carbons are passed through between the cylinder and bed they will be in close contact with both surfaces, and be rotated or revolved by the cylinder from the time they enter on one side till they are discharged on the other. Immediately beneath the wheels Y the bed is provided with inwardly-beveled ribs $z$, arranged transversely on the bed, and matching the bevel of the wheels. These ribs are formed with uniform depth some distance right and left of their center, when they taper out toward the ends and terminate within the edge of the bed. It will be seen, also, that the wheels Y do not begin to bear against the ends of the carbon until the carbon has dropped into the bed and is engaged throughout its length by the surfaces of the bed and the cylinder. When this has occurred, both the wheels and the ribs come gradually into action at the same time and together form the points, as seen in Fig. 21. The carbon, being firmly held at all points between its ends and kept revolving, resists the inward pressure exerted by the beveled faces, and it follows that the surplus material is pressed out through the open space between the wheels and ribs. A knife, $z'$, at the upper edge of bed serves to cut off this material before the carbon is released. The carbons being still warm and pliable, the rolling they receive between these surfaces is beneficial in other respects than aiding in forming the points. If by any reason the carbons have been crooked, the rolling will straighten them, and if in severing the web a seam was left the rolling will press it in and obliterate it. All the carbons after passing through the roller will be of the same length and perfectly smooth and round, and all will have their points formed exactly in the center. If desired, a light cohesive cover— such as rubber—may envelop the cylinder to aid in revolving the carbons. One or both ends of the carbon may be pointed and other obvious changes made in the mechanism without departing from the spirit and scope of my invention. After the carbons are delivered from the pointing mechanism they pass onto a cooling and hardening table, and by being kept in a rotary motion are made to cool uniformly on all sides, thus preventing the crooking which is liable to occur when they cool at one point more rapidly than at another. If desired, the carbons may be exposed to a cold blast at this point, which will hasten the cooling. This being accomplished, the process of manufacture is complete and the carbons are ready to be baked.

The entire proceeding, from the time the molds are filled with the dust till the final step in the process is reached, occupies but comparatively few minutes, and there is no pause or break in the work, except such as is provided for in the general plan, and needed to make the changes which the process involves. It will also be observed that the carbons are constantly in action, and at all times are either supported in or travel over surfaces which protect them their entire length and prevent the bending or warping to which they were liable under the old process.

Having thus described my invention, what I consider new, and desire to secure by Letters Patent, is—

1. The method of separating carbons, consisting, first, in removing the carbons from the mold while in a warm or pliable state to a channeled and grooved platform, and then passing the platform, with the carbons, beneath cutters to cut the webs, substantially as set forth.

2. The method of pointing carbons by forming the point while the carbon is warm and pliable, substantially as set forth.

3. The method of pointing carbons by taking the carbon while in a warm and pliable state and exposing its end to the point-forming mechanism, substantially as set forth.

4. In a carbon-machine, a hydraulic press, a turn-table arranged to pass through the press, and a curved outside track, the ends of which terminate at the turn-table, substantially as set forth.

5. In a carbon-machine, a curved track, a turn-table connecting the ends of said track, a hydraulic press, and a mold with wheels, substantially as set forth.

6. In a carbon-machine, a hydraulic press, an outside track, a mold with wheels, and a stationary device for filling the mold, substantially as set forth.

7. In a carbon-machine provided with a mold, a device for feeding carbon-dust to the mold and a furnace for heating the dust and mold together, substantially as set forth.

8. In a carbon-machine, a hydraulic press, a turn-table, a curved outside track, and a filling device and furnace arranged along said track, substantially as set forth.

9. In a carbon-machine, a hydraulic press or ram, a turn-table, and mechanism connecting the press and turn-table, whereby the table is turned by the movements of the ram, substantially as set forth.

10. A carbon-machine comprising a press, a track, and a mold adapted to move on the track, in combination with a carbon-dust-feeding device arranged to fill the mold, and mechanism whereby the feeding device is operated when the press moves upward and downward, substantially as set forth.

11. In a carbon-machine, a press, a curved track, a mold to travel on the track, a device for feeding dust to the mold, and a shaft and gearing connected with the press and the feeding device, whereby the press is made to operate the feeding device, substantially as set forth.

12. In a carbon-machine, a device for feeding dust to the mold, a press, and a shaft having an arm at one end connected with the press, and arms and cut-off mechanism at the other end for controlling the flow of dust, substantially as set forth.

13. A carbon-machine having a press, tracks leading to and from the press, and a mold to travel on the tracks, in combination with a carbon-dust-feeding device provided with a series of channels for filling the mold and mechanism for operating the feeding device, substantially as set forth.

14. In a carbon-machine having a press, a track and a mold, in combination with a carbon-dust-feeding device provided with grooves and channels and automatic cut-offs in the channels, substantially as set forth.

15. A carbon-dust-feeding device having a series of channels, a revolving screen and worm above said channels, and cut-offs in said channels, in combination with a carbon-mold, substantially as set forth.

16. In a carbon-machine, a carbon-dust-feeding device provided with a channeled sleeve, a channeled guide above the sleeve, and cut-off mechanism, in combination with a mold, substantially as set forth.

17. In a carbon-machine, a carbon-dust-feeding device provided with a channeled sleeve, a carbon-mold, and mechanism for adjusting the sleeve to and from the mold, substantially as set forth.

18. In a carbon-machine, a press, a turn-table arranged to revolve over said press, and gearing connecting the press and table, and constructed to revolve the table when the press descends, substantially as set forth.

19. In a carbon-machine, a hydraulic press or ram, a valve located in the fluid-pipe, and mechanism connecting the ram and valve, whereby the valve is automatically operated by the ram, substantially as set forth.

20. In a carbon-machine, a hydraulic press or ram, induction and eduction fluid-pipes, a valve connected with said pipes, and mechanism connecting said valve with the ram, for automatically operating the valve when the ram reaches the limit of its movement in either direction, substantially as set forth.

21. In a carbon-machine, a hydraulic press or ram, fluid induction and eduction pipes, a rotary valve adapted to said pipes, and reversing mechanism connected with said valve and operated from the hydraulic ram, substantially as set forth.

22. In a carbon-machine, a hydraulic press or ram provided with a rack, fluid induction and eduction pipes, a valve adapted to register with either pipe alternately and provided with a stem carrying a gear-wheel, a segment, and a weighted lever, all combined substantially as set forth.

23. In a carbon-machine provided with a mold on wheels, two car-tracks, one above the other, and a reversing device between them, whereby the carbons are transferred from the mold to a receptacle on the lower track, substantially as set forth.

24. In a carbon-machine, an upper car-track having a section converted into a reversing-table, and a lower track in line with said section, substantially as set forth.

25. In a carbon-machine, an upper track and a mold, in combination with a lower track carrying a car, and a reversing device between the tracks, whereby the carbons are transferred from the mold to the car, substantially as set forth.

26. In a carbon-machine, a car having grooves to hold the carbons, and a grooved cover having ends which project over the ends of the car and inclose the same, substantially as set forth.

27. In a carbon-machine, a platform having grooves for the carbons and slots longitudinally between the grooves, substantially as set forth.

28. In a carbon-machine, a car provided with grooves, and slots running between the grooves, and guide-projections at its sides, substantially as set forth.

29. In a carbon-machine, a car provided with projections on its sides and a track having guides in which the projections move to center the car, substantially as set forth.

30. In a carbon-machine, a platform provided with grooves and slots and a series of cutters arranged to enter the grooves, substantially as set forth.

31. In a carbon-machine, a shaft carrying a series of cutters and a car having a grooved platform, with slots between the grooves, substantially as set forth.

32. In a carbon-machine, a shaft carrying a series of disks, and a car having a corresponding series of slots, through which the disks are adapted to pass, and guides arranged to center the car, substantially as set forth.

33. In a carbon-machine, a cylinder having a plain smooth surface and a concave bed, over which the cylinder is adapted to revolve and rotate the carbons, substantially as set forth.

34. In a carbon-pointing machine, a concave bed, a cylinder having a plain smooth surface revolving over the bed, and point-forming mechanism at the ends of the bed and cylinder, substantially as set forth.

35. In a carbon-pointing machine, a concave bed having a beveled rib at its end and a revolving cylinder carrying a beveled wheel which revolves above the rib, substantially as set forth.

36. In a carbon-pointing machine, a cylinder mounted on a shaft and wheel connected with the cylinder at its end and turning on a bearing eccentric to the axis of the cylinder, substantially as set forth.

37. In a carbon-pointing machine, a cylinder secured rigidly on a shaft, and independent bevel-wheels at its ends mounted eccentrically to said cylinder, and a concave bed, substantially as set forth.

38. In a carbon-pointing machine, a cylinder and shaft secured rigidly together, wheels at the ends of the cylinder, having hubs which move in bearings eccentric to the main shaft, and bolts which connect the cylinder and wheels, substantially as set forth.

39. In a carbon-pointing machine, a cylinder provided with arms flush with its ends, and having enlarged openings therein, in combination with beveled wheels mounted eccentrically to the cylinder and loosely bolted thereto, whereby the two parts are free to change position in relation to each other, substantially as set forth.

40. The process of making carbons, consisting of pressing the carbons in molds, and then, while they are still warm and pliable, severing the webs and forming the points, substantially as set forth.

JOHN T. LISTER.

Witnesses:
H. T. FISHER,
WM. M. MONROE.